(12) United States Patent
Richter et al.

(10) Patent No.: US 9,710,765 B2
(45) Date of Patent: Jul. 18, 2017

(54) BROWSER WITH INTEGRATED PRIVACY CONTROLS AND DASHBOARD FOR SOCIAL NETWORK DATA

(75) Inventors: Michael Judd Richter, Atherton, CA (US); Matthew William Kelly, Palo Alto, CA (US); Austin Haugen, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/116,862

(22) Filed: May 26, 2011

(65) Prior Publication Data

US 2012/0304265 A1  Nov. 29, 2012

(51) Int. Cl.
| | | |
|---|---|---|
| G06F 7/04 | (2006.01) | |
| G06F 15/16 | (2006.01) | |
| G06F 17/30 | (2006.01) | |
| H04L 29/06 | (2006.01) | |
| G06Q 10/00 | (2012.01) | |

(52) U.S. Cl.
CPC .................. *G06Q 10/00* (2013.01)

(58) Field of Classification Search
CPC ............ G06F 17/30899; G06F 17/241; G06F 17/30867; G06F 17/30896; G06Q 10/10; G06Q 10/00
USPC ........... 726/7–8, 2, 3, 5, 26, 27, 28, 29, 30; 715/232–234
See application file for complete search history.

(56) References Cited

U.S. PATENT DOCUMENTS

| | | |
|---|---|---|
| 6,434,599 B1 | 8/2002 | Porter |
| 7,702,653 B1 | 4/2010 | Tan |
| 7,788,260 B2 | 8/2010 | Lunt |
| 7,890,501 B2 | 2/2011 | Lunt |
| 7,945,861 B1 | 5/2011 | Karam |
| 7,949,611 B1 | 5/2011 | Nielsen |
| 8,239,364 B2 | 8/2012 | Wable |
| 8,949,250 B1 * | 2/2015 | Garg et al. ................... 707/748 |
| 2003/0179222 A1 | 9/2003 | Noma |
| 2005/0004985 A1 | 1/2005 | Stochosky |
| 2005/0198031 A1 | 9/2005 | Pezaris |
| 2006/0004892 A1 | 1/2006 | Lunt |

(Continued)

FOREIGN PATENT DOCUMENTS

JP  2009-181260  8/2009

OTHER PUBLICATIONS

International Search Report and Written Opinion for International Application PCT/US2012/038237, Dec. 6, 2012.

(Continued)

*Primary Examiner* — Davoud Zand
(74) *Attorney, Agent, or Firm* — Baker Botts L.L.P.

(57) ABSTRACT

Particular embodiments comprise a method, by one or more computer systems, for accessing a structured document from an external website, wherein the structured document includes markup language containing instructions identifying social network data elements of a social networking system, processing the markup language in the structured document to locate the social network data elements, rendering the structured document based on the markup language, wherein the displayable web page includes one or more of the located social network data elements of the social networking system, and displaying one or more of the located social network data elements of the social networking system proximal to the rendered web page on a display.

12 Claims, 7 Drawing Sheets

(56) References Cited

U.S. PATENT DOCUMENTS

| | | |
|---|---|---|
| 2006/0026233 A1 | 2/2006 | Tenembaum |
| 2007/0214121 A1 | 9/2007 | Ebanks |
| 2007/0282950 A1 | 12/2007 | Fischer |
| 2008/0005223 A1 | 1/2008 | Flake |
| 2008/0016164 A1 | 1/2008 | Chandra |
| 2008/0034040 A1 | 2/2008 | Wherry |
| 2008/0040673 A1 | 2/2008 | Zuckerberg |
| 2008/0114875 A1 | 5/2008 | Anastas |
| 2008/0243830 A1 | 10/2008 | Abhyanker |
| 2009/0106822 A1 | 4/2009 | Obasanjo |
| 2009/0249244 A1 | 10/2009 | Robinson |
| 2009/0254843 A1 | 10/2009 | Wie |
| 2009/0287645 A1 | 11/2009 | Dasdan |
| 2010/0023584 A1 | 1/2010 | Kamdar |
| 2010/0023868 A1 | 1/2010 | Bonforte |
| 2010/0132049 A1 | 5/2010 | Vernal |
| 2010/0177696 A1 | 7/2010 | Jung |
| 2011/0022657 A1* | 1/2011 | Zhu et al. ............ 709/204 |
| 2011/0055314 A1 | 3/2011 | Rosenstein |
| 2011/0061016 A1* | 3/2011 | Song et al. ............ 715/779 |
| 2011/0066636 A1 | 3/2011 | Guido |
| 2011/0066957 A1* | 3/2011 | Prats et al. ............ 715/753 |
| 2011/0087658 A1 | 4/2011 | Lunt |
| 2011/0088039 A1* | 4/2011 | Tabone et al. ............ 718/104 |
| 2011/0093460 A1 | 4/2011 | Lunt |
| 2011/0093498 A1 | 4/2011 | Lunt |
| 2011/0099167 A1 | 4/2011 | Galbreath |
| 2011/0099495 A1 | 4/2011 | Harrington |
| 2011/0119335 A1 | 5/2011 | Galbreath |
| 2011/0314386 A1 | 12/2011 | Jeong |
| 2012/0047147 A1* | 2/2012 | Redstone et al. ............ 707/748 |
| 2012/0278343 A1* | 11/2012 | Steele et al. ............ 707/754 |
| 2012/0278387 A1* | 11/2012 | Garcia et al. ............ 709/204 |
| 2012/0290637 A1 | 11/2012 | Perantatos |
| 2012/0317109 A1 | 12/2012 | Richter |
| 2012/0331067 A1 | 12/2012 | Richter |
| 2013/0097180 A1* | 4/2013 | Tseng ............ 707/748 |
| 2013/0132488 A1* | 5/2013 | Bosworth et al. ............ 709/206 |
| 2013/0198285 A1 | 8/2013 | Ourega |
| 2013/0239178 A1* | 9/2013 | LaRosa ............ G06F 17/30867 726/4 |
| 2014/0337317 A1* | 11/2014 | Woss et al. ............ 707/722 |
| 2015/0039597 A1* | 2/2015 | Raina et al. ............ 707/723 |
| 2015/0186544 A1* | 7/2015 | Benedum et al. ............ 715/234 |

OTHER PUBLICATIONS

International Search Report and Written Opinion for PCT/US2012/040976, Dec. 26, 2012.
International Search Report and Written Opinion for PCT/US2012/038918, Nov. 30, 2012.
International Search Report and Written Opinion for PCT/US2012/038916, Dec. 20, 2012.
Office Action for U.S. Appl. No. 13/159,247, Apr. 1, 2013.
Office Action for U.S. Appl. No. 13/168,808, Jun. 26, 2013.
Office Action for U. S Appl. No. 13/116,945, Apr. 26, 2013.
Office Action for U.S. Appl. No. 13/116,923, Apr. 18, 2013.
Office Action for U.S. Appl. No. 13/116,909, Mar. 15, 2013.
Final Office Action for U.S. Appl. No. 13/159,247, Oct. 11, 2013.
Final Office Action for U.S. Appl. No. 13/116,923, Nov. 15, 2013.
Final Office Action for U.S. Appl. No. 13/116,945, Nov. 20, 2013.
Notice of Allowance for U.S. Appl. No. 13/116,909, Nov. 20, 2013.
Office Action for U.S. Appl. No. 13/168,808, Feb. 24, 2014.
Notice of Allowance for U.S. Appl. No. 13/116,923, Apr. 10, 2014.
MX Office Action for Application No. MX/A/2013/014807, Feb. 18, 2015.
AU Patent Examination Report for Application No. 2012-258908, May 20, 2015.
Office Action for U.S. Appl. No. 13/116,945, Sep. 24, 2014.
Office Action for U.S. Appl. No. 13/168,808, Jan. 20, 2015.

* cited by examiner

BROWSER WITH INTEGRATED PRIVACY CONTROLS AND DASHBOARD FOR SOCIAL NETWORK DATA

TECHNICAL FIELD

The present disclosure generally relates to social networking systems, and more specifically relates to accessing social networking systems in connection with third party websites.

BACKGROUND

A social network, in general, is a social structure made up of entities, such as individuals or organizations, that are connected by one or more types of interdependency or relationships, such as friendship, kinship, common interest, financial exchange, dislike, or relationships of beliefs, knowledge, or prestige. In more recent years, social networks have taken advantage of the Internet. There are social-networking systems existing on the Internet in the form of social-networking websites. A social networking system, such as a social networking website, enables its users to interact with it and with each other through the system.

The social networking system may create and store a record, often referred to as a user profile, in connection with the user. The user profile may include a user's demographic information, communication channel information, and personal interests. The social networking system may also create and store a record of a user's relationship with other users in the social networking system (e.g., social graph), as well as provide services (e.g., wall-posts, photo-sharing, or instant messaging) to facilitate social interaction between users in the social networking system. The social networking system may also create and store user preferences.

A social networking system may support application programming interfaces and associated functionality that allows third-party systems to access user profile data of its users. Such third party websites can use the user profile data can use the identity and account of a user for purposes of identifying users and maintaining their accounts at such third party websites. These third party websites may also access user profile data in order to personalize or customize the user experience on the site.

SUMMARY

The present disclosure generally relates to social networking systems, and more specifically relates to accessing social networking systems in connection with third party websites.

In particular embodiments, a method comprising, by one or more computer systems, accessing a structured document from an external website, wherein the structured document includes markup language containing instructions identifying social network data elements of a social networking system, processing the markup language in the structured document to locate the social network data elements, rendering the structured document based on the markup language, wherein the displayable web page includes one or more of the located social network data elements of the social networking system, and displaying one or more of the located social network data elements of the social networking system proximal to the rendered web page on a display.

These and other features, aspects, and advantages of the disclosure are described in more detail below in the detailed description and in conjunction with the following figures.

DESCRIPTION OF EXAMPLE EMBODIMENTS

Figure 1:
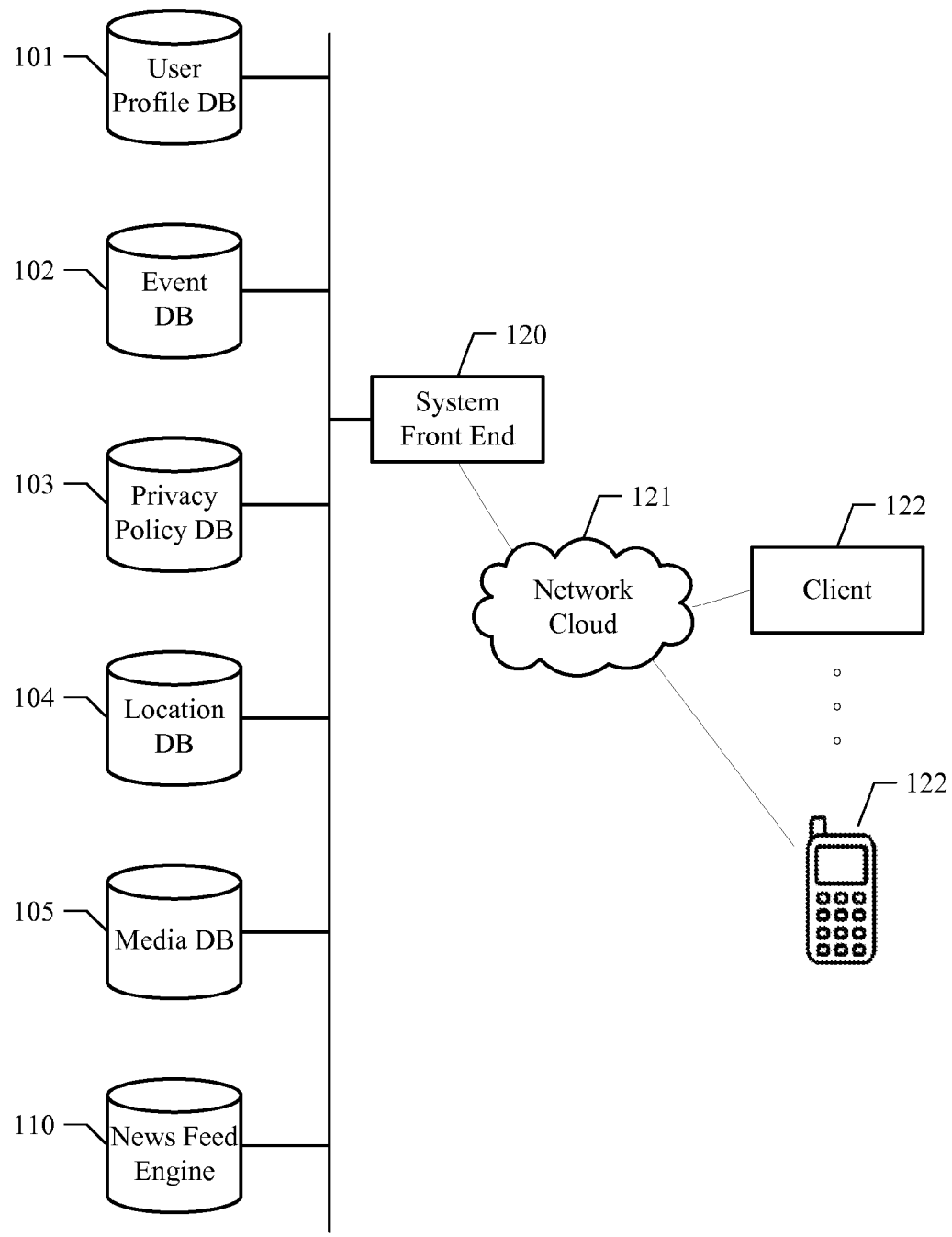
FIG. 1 illustrates an example social network system.

The present disclosure is now described in detail with reference to a few embodiments thereof as illustrated in the accompanying drawings. In the following description, numerous specific details are set forth in order to provide a thorough understanding of the present disclosure. However, the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

Social Network Systems and Accessible User Profile Data

A social networking system, such as a social networking website, enables its users to interact with it, and with each other, through the system. Typically, to become a registered user of a social networking system, an entity, either human or non-human, registers for an account with the social networking system. Thereafter, the registered user may login to the social networking system via an account by providing, for example, a correct login ID or username and password. As used herein, a "user" may be an individual (human user), an entity (e.g., an enterprise, business, or third party application), or a group (e.g., of individuals or entities) that interacts or communicates with or over such a social network environment.

When a user registers for an account with a social networking system, the social networking system may create and store a record, often referred to as a "user profile," in connection with the user. The user profile may include information provided by the user and information gathered by various systems, including the social networking system, relating to activities or actions of the user. For example, the user may provide his name, profile picture, contact information, birth date, gender, marital status, family status, employment, education background, preferences, interests, and other demographical information to be included in his user profile. The user may identify other users of the social networking system that the user considers to be his friends. A list of the user's friends or first degree contacts may be included in the user's profile. Connections in social networking systems may be in both directions or may be in just one direction. For example, if Bob and Joe are both users and connect with each another, Bob and Joe are each connections of the other. If, on the other hand, Bob wishes to connect to Sam to view Sam's posted content items, but Sam does not choose to connect to Bob, a one-way connection may be formed where Sam is Bob's connection, but Bob is not Sam's connection. Some embodiments of a social networking system allow the connection to be indirect via one or more levels of connections (e.g., friends of friends). Connections may be added explicitly by a user, for example, the user selecting a particular other user to be a friend, or automatically created by the social networking system based on common characteristics of the users (e.g., users who are alumni of the same educational institution). The user may identify or bookmark websites or web pages he visits frequently and these websites or web pages may be included in the user's profile.

The user may provide information relating to various aspects of the user (such as contact information and interests) at the time the user registers for an account or at a later time. The user may also update his or her profile information at any time. For example, when the user moves, or changes a phone number, he may update his contact information. Additionally, the user's interests may change as time passes, and the user may update his interests in his profile from time to time. A user's activities on the social networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend). A contact may also write messages to the user's profile pages—typically known as wall-posts. A user may also input status messages that get posted to the user's profile page.

A social network system may maintain social graph information, which can generally model the relationships among groups of individuals, and may include relationships ranging from casual acquaintances to close familial bonds. A social network may be represented using a graph structure. Each node of the graph corresponds to a member of the social network. Edges connecting two nodes represent a relationship between two users. In addition, the degree of separation between any two nodes is defined as the minimum number of hops required to traverse the graph from one node to the other. A degree of separation between two users can be considered a measure of relatedness between the two users represented by the nodes in the graph.

A social networking system may support a variety of applications, such as photo sharing, on-line calendars, search, events, and location-based services. For example, the social networking system may allow users to post photographs and other multimedia files to a user's profile, such as in a wall post or in a photo album, both of which may be accessible to other users of the social networking system. Social networking system may also allow users to configure events. For example, a first user may configure an event with attributes including time and date of the event, location of the event and other users invited to the event. The invited users may receive invitations to the event and respond (such as by accepting the invitation or declining it). Furthermore, social networking system may allow users to maintain a personal calendar. Similarly to events, the calendar entries may include times, dates, locations and identities of other users.

The social networking system may also support a privacy model. A user may or may not wish to share his information with other users or third-party applications, or a user may wish to share his information only with specific users or third-party applications. A user may control whether his information is shared with other users or third-party applications through privacy settings associated with his user profile. For example, a user may select a privacy setting for each user datum associated with the user and/or select settings that apply globally or to categories or types of user profile information. A privacy setting defines, or identifies, the set of entities (e.g., other users, connections of the user, friends of friends, or third party application) that may have access to the user datum. The privacy setting may be specified on various levels of granularity, such as by specifying particular entities in the social network (e.g., other users), predefined groups of the user's connections, a particular type of connections, all of the user's connections, all first-degree connections of the user's connections, the entire social network, or even the entire Internet (e.g., to make the posted content item index-able and searchable on the Internet). A user may choose a default privacy setting for all user data that is to be posted. Additionally, a user may specifically exclude certain entities from viewing a user datum or a particular type of user data.

Social networking system may maintain a database of information relating to geographic locations or places. Places may correspond to various physical locations, such as restaurants, bars, train stations, airports and the like. Some places may correspond to larger regions that themselves contain places—such as a restaurant or a gate location in an airport. In one implementation, each place can be maintained as a hub node in a social graph or other data structure maintained by the social networking system, as described in U.S. patent application Ser. No. 12/763,171, which is incorporated by reference herein for all purposes. Social networking system may allow users to access information regarding each place using a client application (e.g., a browser) hosted by a wired or wireless station, such as a laptop, desktop or mobile device. For example, social networking system may serve web pages (or other structured documents) to users that request information about a place. In addition to user profile and place information, the social networking system may track or maintain other information about the user. For example, the social networking system may support geo-social networking system functionality including one or more location-based services that record the user's location. For example, users may access the geo-social networking system using a special-purpose client application hosted by a mobile device of the user (or a web- or network-based application using a browser client). The client application may automatically access Global Positioning System (GPS) or other geo-location functions supported by the mobile device and report the user's current location to the geo-social networking system. In addition, the client application may support geo-social networking functionality that allows users to check-in at various locations and communicate this location to other users. A check-in to a given place may occur when a user is physically located at a place and, using a mobile device, access the geo-social networking system to register the user's presence at the place. A user may select a place from a list of existing places near to the user's current location or create a new place. The user may also provide comments in a text string when checking in to a given place. The user may also identify one or more other users in connection with a check-in (such as friends of a user) and associate them with the check-in as well. U.S. patent application Ser. No. 12/574,614, which is incorporated by reference herein for all purposes, describes a system that allows a first user to check-in other users at a given place. An entry including a comment and a time stamp corresponding to the time the user checked in may be displayed to other users. For example, a record of the user's check-in activity may be stored in a database. Social networking system may select one or more records associated with check-in activities of users at a given place and include such check-in activity in web pages (or other structured documents) that correspond to a given place. For example, social networking system may select the check-in activity associated with the friends or other social contacts of a user that requests a page corresponding to a place. U.S. application Ser. No. 12/858, 718, incorporated by reference in its entirety for all purposes, describes an example geo-social networking system that can be used in connection with various embodiments of the present invention. The check-in activity may also be displayed on a user profile page and in news feeds provided to users of the social networking system. Still further, third party systems may also access this information provided the users' respective privacy configurations allow such access.

FIG. 1 illustrates an example social networking system. In particular embodiments, the social networking system may store user profile data and social graph information in user profile database 101. In particular embodiments, the social networking system may store user event data and calendar data in event database 102. In particular embodiments, the social networking system may store user privacy policy data in privacy policy database 103. In particular embodiments, the social networking system may store geographic and location data in location database 104. In particular embodiments, the social networking system may store media data (e.g., photos, or video clips) in media database 105. In particular embodiments, databases 101, 102, 103, 104, 105, and 110 may be operably connected to the social networking system's front end 120. In particular embodiments, the front end 120 may interact with client device 122 through network cloud 121. Client device 122 is generally a computer or computing device including functionality for communicating over a computer network (e.g., remotely). Client device 122 may be a desktop computer, laptop computer, personal digital assistant (PDA), in- or out-of-car navigation system, smart phone or other cellular or mobile phone, or mobile gaming device, among other suitable mobile computing devices. Client device 122 may execute one or more client applications, such as a web browser (e.g., Microsoft Windows Internet Explorer, Mozilla Firefox, Apple Safari, Google Chrome, and Opera, etc.), to access and view content over a computer network. Front end 120 may include web or HTTP server functionality, as well as other functionality, to allow users to access the social networking system. Network cloud 121 generally represents a network or collection of networks (such as the Internet or a corporate intranet, or a combination of both) over which client devices 122 may access the social network system.

In particular embodiments, user profile database 101 may store communication channel information and an address book of a user. The address book, in one implementation, may be a superset or a subset of the users of the social networking system that a user has established a friend or contact relationship. In particular embodiments, event database 102 may store event data for any number of particular events and the data associated with each event including the name of the event, the date and time of the event, the event location, particular users who are invited to participate or who are participating in the event, and other user or participant's comments about the event. For example, a user may schedule an event through the social networking system, which has an associated link so that any invited user may participate, or any user if the event is open to any user. In particular embodiments, location database 104 may store geo-location data identifying a real-world geographic location of a user associated with a check-in. For example, a geographic location of an Internet connected computer can be identified by the computer's IP address. For example, a geographic location of a cell phone equipped with Wi-Fi and GPS capabilities can be identified by cell tower triangulation, Wi-Fi positioning, and/or GPS positioning. In particular embodiments, location database 104 may store an information base of places, where each place includes a name, a geographic location and meta information.

In particular embodiments, privacy policy database 103 may store a user's privacy data for a user's settings for each user datum associated with the user and the user's settings for third party applications. For example, a user may have selected default privacy settings or a user may have specifically excluded certain entities from viewing a user datum or particular type of user data, and all of that privacy data for all users and friends of users may be stored in the privacy policy database 103.

In particular embodiments, a user's privacy data may comprise privacy settings associated with any aspect of the user profile, including changes that the user makes to the user profile, events, locations, media, activities, connections between one or more users, the news feed associated with the user or any other action that the user takes in the social networking system. In particular embodiments, the privacy settings associated with the privacy policy database 103 may be provided and stored at different levels of granularity. In particular embodiments, for example, the information to be shared may be specific information, such as, work phone number, or a set of related information, such as, personal information including several pieces of related information including profile photo, home phone number, and status. Alternatively, in particular embodiments, the privacy settings associated with the privacy policy database 103 may apply to all the information associated with the user in the social networking system.

In particular embodiments, the specification of the set of entities that may access particular user information may also be specified at various levels of granularity. In particular embodiments, the user may specify any number of entities with which information may be shared. In particular embodiments, sets of entities with which information may be shared may include, for example, specified friends of the user, all friends of the user, all friends of friends, all applications, and all external systems. In particular embodiments, for example, the user may provide a list of external systems that may access certain information as well.

In particular embodiments, may specify a set of entities that includes exceptions that are not allowed to access the user's information. In particular embodiments, for example, the user of the social networking system may allow all external systems to access the user's work information but specify a list of external systems that are not allowed to access the work information. In particular embodiments, the list of exceptions that are not allowed to access certain information of the user may be a "block list." In particular embodiments, external systems belonging to a block list specified by a user of the social networking system are blocked from accessing the information specified in the privacy setting stored in privacy policy database 103. Particular embodiments contemplate various combinations of granularity of permitted access or denial of access depending on the type of user information and sets of entities with which information may be shared or accessed by the sets of entities, as specified by the user and stored in the privacy policy database 103.

The social networking system may also include media sharing capabilities. In particular embodiments, a user of the social networking system may upload one or more media files to media database 105. For example, a user can upload a photo or a set of photos (often called a photo album), or a video clip to media database 105 from a client device 122 (e.g., a computer, or a camera phone). In particular embodiments, the one or more media files may contain metadata (often called "tags") associated with each media file. For example, a photo shot by a digital camera may contain metadata relating to file size, resolution, time stamp, name of the camera maker, and/or location (e.g., GPS) coordinates.

Figure 2:
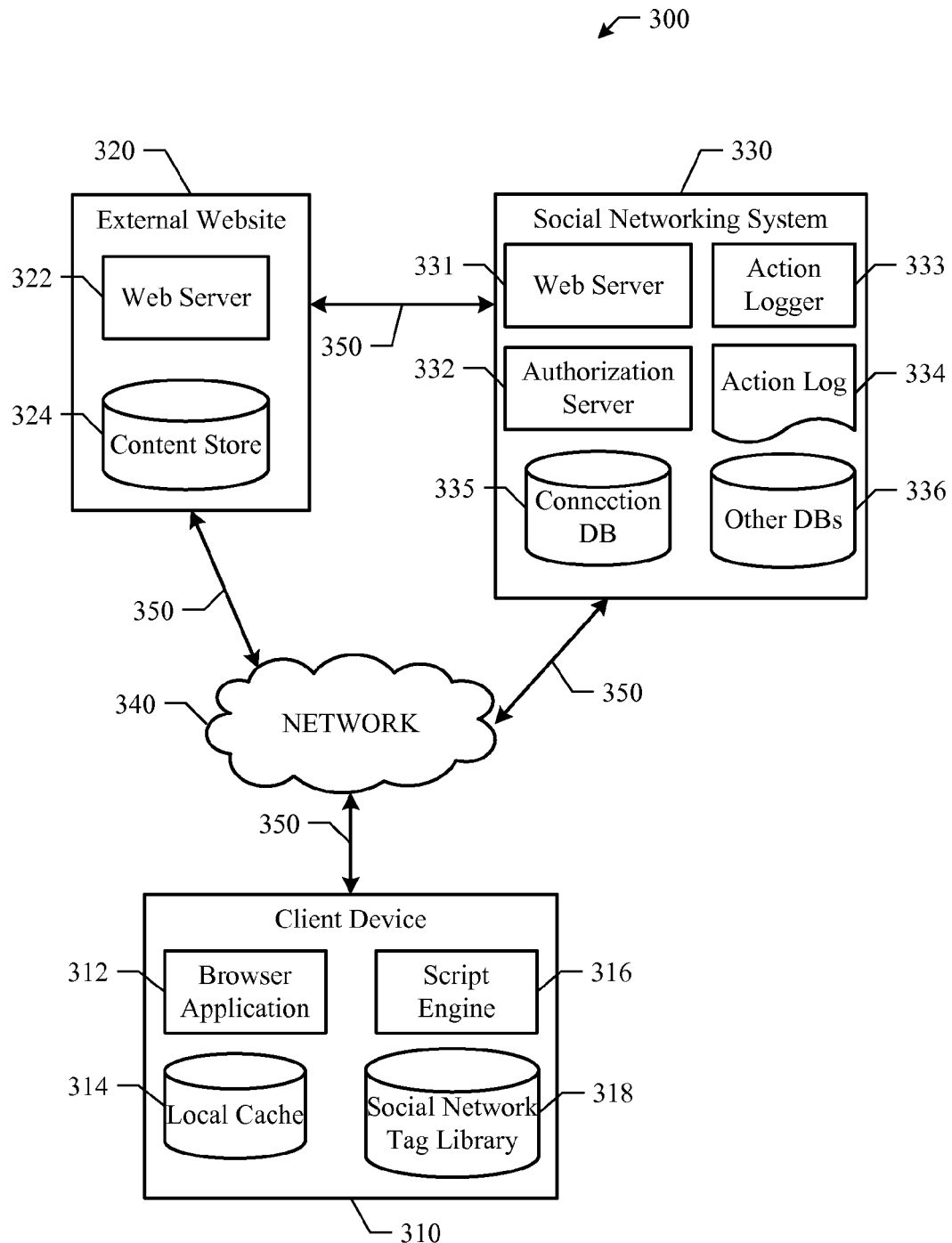
FIG. 2 illustrates an example system.

FIG. 2 illustrates a particular embodiment of a system that includes a client device 310, an external website 320, and a social networking system 330. In particular embodiments, links 350 illustrate interactions between client device 310 and external website 320, between client device 310 and social networking system 330, and between external website 320 and social networking system 330.

In particular embodiments, client device 310 may host a browser application 312 or other application that processes structured documents. In particular embodiments, client device 310 may have received one or more structured documents from external website 320 and/or social networking system 330. In particular embodiments, the structured document may be a markup language document that contains text, links, scripts, and other attributes, such as application programming interface (API) calls identifying social network data elements of a user profile maintained by social networking system 330. In particular embodiments, the structured document may contain instructions, for example, to specify how to render content for display at client device 310. In particular embodiments, the structured document may contain instructions, for example, on how to access additional information from social networking system 330. Alternatively, the instructions within structured document may contain program logic interpreted by a scripting engine 316 on the client device 310.

In particular embodiments, browser application 312 may process the markup language in the structured document and render the structured document as a displayable web page. In particular embodiments, the displayable web page may include content of the external website 320 as well as one or more of the located social network data elements of the social networking system 330. In particular embodiments, browser application 312 may display the rendered web page on a display of client device 310. For example, a structured document hosted by external website 320 may contain an API call for a profile picture of a user. The browser application 312, when processing the structured document, may transmit a request to social networking system 330 to retrieve the user's profile picture. The request may be an HTTP request and may further include a browser cookie with information identifying the user of social networking system 330. The browser cookie may include state and other information indicating the status of the user, for example, whether the user has recently logged in and/or authenticated to the social networking system 330. Still further, the structured document provided by external website 320 may include a segment (such as a div or iframe) that prompts the user to log in to social network system 330. For example, the structured document may include HTML code, Javascript and other controls that cause the browser hosted by client device 310 to access social networking system 330 and render a login interface in a section of the displayed structured document.

In particular embodiments external website 320 and social networking system 330 may have one or more users or members. In particular embodiments, users of external website 320 may also be users of social networking system 330. In particular embodiments, a user may interact with external website 320 and/or the social networking system 330 using client device 310. In particular embodiments, the social networking system 330 may keep user profile information and the connections among the users.

In particular embodiments, the social networking system 330 may receive requests from either the external website 320 or the client device 310 to which the social networking system 330 may respond with the requested information or with a subset of the requested information. Particular interactions between client device 310, the external website 320, and the social networking system 330 and information exchanged between the three systems will be described later in detail. As discussed in more detail below, implementations of the invention include augmented client-side functionality directed to informing the user as to which social network data elements of the user the external website 320 desires access and allows the user to control such access consistent with his or her privacy configurations.

In particular embodiments, social networking system 330 may include a web server 331, an authorization server 332, an action logger 333, an action log 334, a connection database 335, and other databases 336, such as the databases described in FIG. 1. In particular embodiments, social networking system 330 may include additional, fewer, or different modules for various applications. Conventional components such as network interfaces, security mechanisms, load balancers, failover servers, management and network operations consoles, and the like are not shown so as to not obscure the details of the system and will be described later. In particular embodiments, the social networking system 330 comprises a computing system that allows users to communicate or otherwise interact with each other and access content as described herein. These and other functionalities of social networking system 330 have also been described in detail above.

In particular embodiments, the social networking system 330 stores data describing one or more connections between different users in the connection database 335. Particular embodiments of the connection database 335 may store connection information for users who have indicated similar or common work experience, group memberships, hobbies, or educational history. In particular embodiments, the social networking system 330 may also include user-defined connections between different users and those connections may be stored in connection database 335 as well. Particular embodiments of connection database 335 may allow users to specify their relationships with other users. In particular embodiments, for example, these user defined connections allows users to generate relationships with other users that parallel the users' real-life relationships, such as friends, relatives, co-workers, partners, and so forth. In particular embodiments, users may select from predefined types of connections, or define their own connection types, as needed.

In particular embodiments, the web server 331 links the social networking system 330 via the network 340 to one or more client devices 310. In particular embodiments, the web server 331 serves web pages, as well as other web-related content, such as Java, Flash, XML, and so forth. Particular embodiments of the web server 331 may include a mail server or other messaging functionality for receiving and routing messages between the social networking system 331 and the client devices 310. In particular embodiments, the messages may be instant messages, queued messages (e.g., email), text and SMS messages, or any other suitable messaging technique.

In particular embodiments, the action logger 333 is capable of receiving communications from the web server 331 about user actions on and/or off the social networking system 330. In particular embodiments, the action logger 333 populates the action log 334 with information about user actions in order to track them. More specifically, any action that a particular user takes with respect to another user is associated with each user's profile through information maintained in a database or other data repository, such as the action log 334. In particular embodiments, the actions taken by the members that are recorded in the action log 334 may be actions taken by the members on the social networking system 330 or actions taken by the members on the external website 320. In particular embodiments, the actions taken by the members on an external website 320 are communicated to the web server 331 and the web server 331 sends a request to the action logger 333 to record the actions in the action log 334. In particular embodiments, such actions may include, for example, adding a connection to the other user, sending a message to the other user, reading a message from the other user, viewing content associated with the other user, attending an event posted by another user, among others. Additionally, in particular embodiments, actions in connection with other objects may be directed at particular users, and these actions may be associated with those users as well.

In particular embodiments, when a user takes an action on the social networking system 330, the action is recorded in an action log 334. In particular embodiments, the social networking system 330 maintains the action log 334 as a database of entries. In particular embodiments, when an action is taken on the social networking system 330, the social networking system 330 adds an entry for that action to the action log 334.

In particular embodiments, the authorization server 332 enforces the privacy settings of the users of the social networking system, such as described above with respect to privacy policy database 103. In particular embodiments, the privacy setting of a user determines how particular information associated with a user may be shared. In particular embodiments, as described above, the privacy policy database comprises the privacy data for a user's settings for each user datum associated with the user and the user's settings for third party applications, More specifically, the privacy data for a user's settings may specify particular information associated with a user and the entity or entities with whom the information may be shared. In particular embodiments, the entities with which information may be shared, may include users, third party applications, external websites, or any other entity that can potentially access the information. In particular embodiments, the information that may be shared by a user may comprise any aspect of the user profile, events, locations, media, activities, or the news feed associated with the user.

Figure 3:
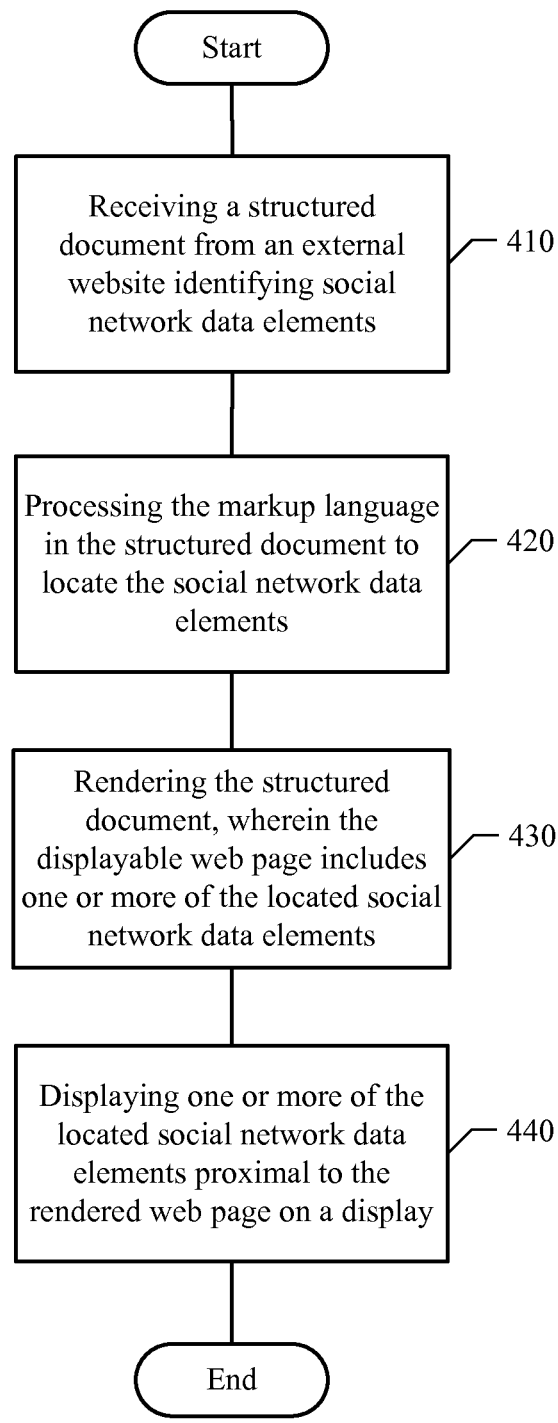
FIG. 3 is a flow chart diagram that illustrates a first method.
Figure 4:
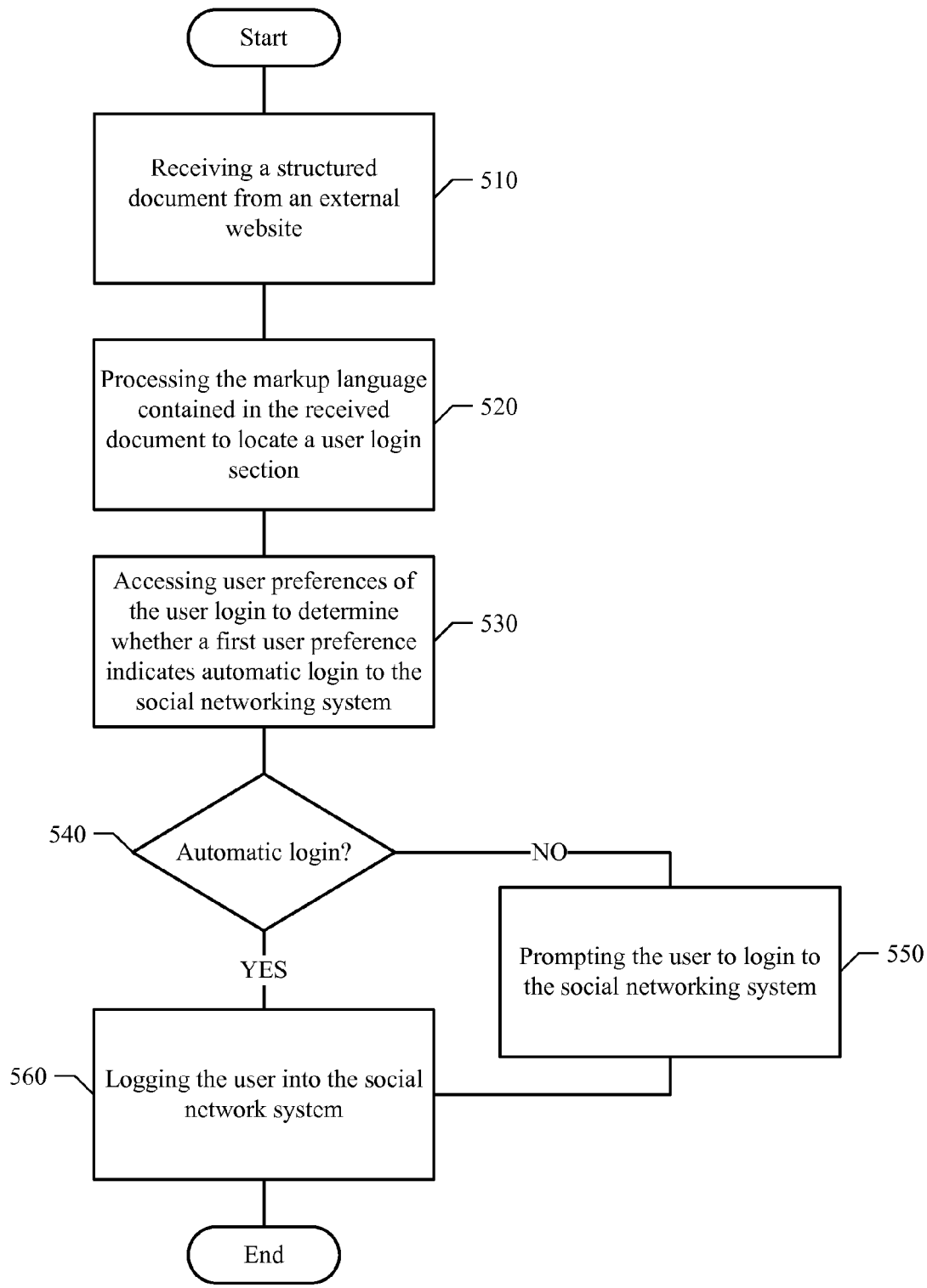
FIG. 4 is a flow chart diagram that illustrates a second method.

FIGS. 3 and 4 illustrate example methods of displaying a dashboard identifying social network data elements and integrating privacy controls of a social networking system by logging a user accessing an external website into a social networking system. Particular embodiments relate to a plug-in software application (hereinafter referred to as "social enhancement application") that operates or executes in the context of a browser (e.g., a web browser) or other application client that consumes structured documents. In other implementations, the functionality described herein can be incorporated directly into a browser client application, as opposed to being a plug-in.

Typically, a web browser is used to access a webpage (or other structured document) for rendering at a client device. A web browser application is generally a computer program configured to run on a user's computing device (e.g., client device 122, 310) that enables the user to connect to various server-hosted webpages available over a network. A non-exhaustive set of common web browsers include, by way of example, Internet Explorer™, Firefox™, Safari™, and Opera™. The web browser provides a standard viewing window that displays the informational and visual content of the webpage or website (the term "website" and "webpage" may be used interchangeably herein where appropriate). The URL of the website presently being rendered and viewed is displayed in the address box of the web browser GUI. The address box enables a user to input an address (e.g., a URL) for a desired (target) webpage. The content of the website generally includes graphical images, text, and/or hyperlinks (e.g., comprising code segments that redirect the web browser and user to another portion of the webpage or to a subsequent webpage altogether without requiring manual input of the subsequent webpage's address). In various example embodiments, the webpage can also include audio, video, and other types of web content. To facilitate navigation of the rendered page, the web browser GUI may include scrolling bars or buttons. By clicking and/or dragging these bars or buttons, a user may selectively view other portions of the webpage, which do not entirely fit the immediately viewable areas of the GUI rendered by the web browser.

Typically, to render a webpage associated with a web application, the web application and/or web browser at a client device requires access to one or more resources provided at one or more backend servers of an associated website. A resource or webpage, which may itself include multiple embedded resources, may include data records, such as content plain textual information, or more complex digitally encoded multimedia content, such as software programs or other code objects, graphics, images, audio signals, videos, and so forth. One prevalent markup language for creating web pages is the Hypertext Markup Language (HTML). Other common web browser-supported languages and technologies include the Extensible Markup Language (XML), the Extensible Hypertext Markup Language (XHTML), JavaScript, Cascading Style Sheet (CSS), and, frequently, Java.

In particular embodiments, HTML may enable a page developer to create a structured document by denoting structural semantics for text and links, as well as images, web applications and other objects that can be embedded within the page. Generally, a web page may be delivered to a client as a static document, however, through the use of web elements embedded in the page, an interactive experience may be achieved with the page or a sequence of pages. The web browser obtains the required resources (e.g., in response to executing JavaScripts or other calls embedded in a requested and received structured document and which may include HTML or XML code and/or JavaScript scripts and/or content including text, audio, and video) for rendering the webpage from one or more servers and then constructs a browser representation of the webpage. In particular embodiments, the browser processes the structured document and creates an in-memory representation of the document. The representation may be a Document Object Model (DOM) representation of the webpage. The web browser then renders the page in the particular client viewing window of the browser utilizing the DOM (or other suitable) representation.

Automatic Log-in to Social Network Site

FIG. 4 illustrates an example method of integrating privacy controls of a social networking system by logging in a user accessing an external website into a social networking system. A browser client and/or a plug-in to a browser client may implement the operations described below. Similar to steps described later in FIG. 3, particular embodiments may receive a structured document from an external website identifying social network data elements, as illustrated in step 510. In particular embodiments, the method may begin with accessing a target structured document by a web application or a web browser operating at a client device. In particular embodiments, when a structured document is requested having HTML or other markup language content, such as content within a structured document, it is received by the web browser in order to process the page so that the web browser may render the webpage.

Particular embodiments may process the markup language contained in the received structured document to locate a user login section, as illustrated in step 520. In particular embodiments, the markup language in the structured document contains code segments for a user login section at social networking system 330. In particular embodiments, the code segments may include tags for directly accessing user preferences for a user of a social networking system. In particular embodiments, for example, the code segments for directly accessing user preferences within a social networking system may be <fb:login perms="email"></fb.login>. In particular embodiments, the code segments may be Javascript code for presenting a login interface to the user and connecting the user to the social networking system. In particular embodiments, for example the Javascript code may create a social networking system login button displayed on the rendered structured document that the user may click on to log into the social networking system. In other particular embodiments, the received structured document may include tags or other API calls that cause the social browser extension to identify a login and, optionally, create the HTML code that renders the login in the browser.

Particular embodiments may access user preferences associated with the user relating to logins to determine whether a first user preference indicates an automatic login to the social networking system, as illustrated in step 530. In particular embodiments, the user preferences that indicate automatic login of the user to the social networking system may be associated with the privacy settings and other information stored in privacy policy database 103. In particular embodiments, one or more aspects of the users privacy settings may be stored locally (and/or synchronized with privacy policy database) at the browser application in the client device to obviate the need for remote access.

In particular embodiments, as described above with respect to privacy policy database 103, a user may store privacy settings and may specify particular entities, third party applications, or website domains that may or may not be allowed to access the user's information in the social networking system. In particular embodiments, the user's privacy settings may grant full access to all third party entities, third party applications, or website domains. In particular embodiments, the user's privacy settings may restrict specific entities, third party application, or website domains. In particular embodiments, the user's privacy settings may limit or grant access to particular types of social network data. Particular embodiments, for example, may grant full access to a user's social network data to http://www.nytimes.com. Particular embodiments, for example, may also restrict access entirely to another website, such as http://www.youtube.com, or particular embodiments may merely restrict the types of social network data that http://www.youtube.com may access.

Particular embodiments may determine whether the user should be automatically logged into the social networking system, as illustrated in step 540. In particular embodiments, based on the information stored for a user in the privacy policy database 103, the social networking system may or may not automatically log the user into the social networking system. Where the user preferences indicate that the user may be automatically logged in, particular embodiments may log the user into the social networking system, as illustrated instep 560. In particular embodiments, if a user has a stored preference for automatic login in to the social networking system, the user may then be automatically logged in to the social networking system. In one implementation, to log the user in, the browser client or plug-in may generate an on-click event that simulates a user click on a login button or other control. Such an action may cause the browser client and/or plug-in to auto-fill the username and password fields and simulate a mouse click on the login button to transmit a login request to the social networking system. The social networking system may authenticate the request, change the user's status to indicate the login, and return a response to the browser client.

In particular embodiments where there is no automatic login, the user may be may be prompted to log in to the social networking system, as illustrated in step 550. In particular embodiments, in order to login to the social networking system via an account, the user may provide a correct login ID or username and a password for the social networking system. In particular embodiments, once the user is logged into the social network system 330, social network data may be transmitted between external website 320 and social networking system 330. Even if the user is not logged into the social network system 330, if the user preferences indicate that the user's social network data may be shared with external websites, in particular embodiments, social network data may be transmitted between external website 320 and social networking system 330.

FIG. 3 illustrates an example method of displaying a dashboard identifying social network data elements that an external website desires to access from the social networking system 330. Particular embodiments may begin with a web application or a web browser operating at a client device 310 accessing a target structured document hosted by an external website 320. Particular embodiments may receive the structured document from an external website 320 identifying social network data elements, as illustrated in step 410.

As discussed above, when a structured document is requested having HTML or other markup language content, such as content within a structured document, it is received by the web browser in order to process the page so that the web browser may render the webpage. As further discussed above, the structured document may include embedded API calls that access one or more social network data elements (e.g., profile pictures, contact lists, interests, hobbies, groups, affiliations, calendars, and the like). In other implementations, the external website may access the social networking system directly to obtain one or more of the social network data elements and add it directly to the structured document prior to transmission to the client device. As discussed herein, to support a transparent privacy and data security model, the structured document provided by the external website may include one or more tags that identify which social network data elements the external website desires to access by either or both of the mechanisms described above. As discussed below, the browser client may, during processing of the structured document, access these tags and/or embedded API calls to the social networking system and provide indications to the user which social network data elements the external website desires to access.

In particular embodiments, the structured document may include tags identifying social network data elements. In particular embodiments, the tags may be <meta> tags that are not displayed in the rendered structured document by the browser application. In particular embodiments, social network data elements may comprise custom tags for performing specialized tasks associated with the social networking system. In particular embodiments, social network data elements may comprise an entire library of custom tags whereby the interpretation of those specialized tags allows for specific information to be retrieved from the social networking system.

Particular embodiments may process the markup language in the structured document to locate the social network data elements, as illustrated in step 420. During a user session at the client, the web browser interprets and displays the pages and associated resources received or retrieved from the website hosting the page, as well as, potentially, resources from other websites. In particular embodiments, social network data elements include tags for any available permissions, such as the data, publishing, and page permissions listed in Appendix A.

Particular embodiments may render the structured document, wherein the displayable web page includes one or more of the located social network data elements, as illustrated in step 430. In particular embodiments, the web browser application constructs a corresponding DOM representation of the underlying web content from which to render the webpage. As the web browser parses the HTML, it constructs an internal document tree representing all of the elements to be displayed. In particular embodiments, the web browser application may access the DOM (or other suitable) representation of the currently rendered target webpage generated by the web browser.

Figure 5A:
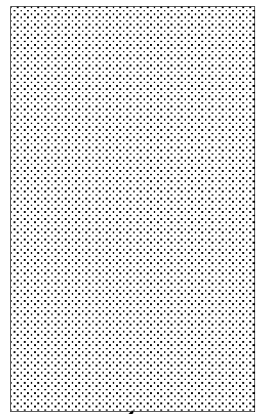
FIG. 5a illustrates an example dashboard.
Figure 5B:
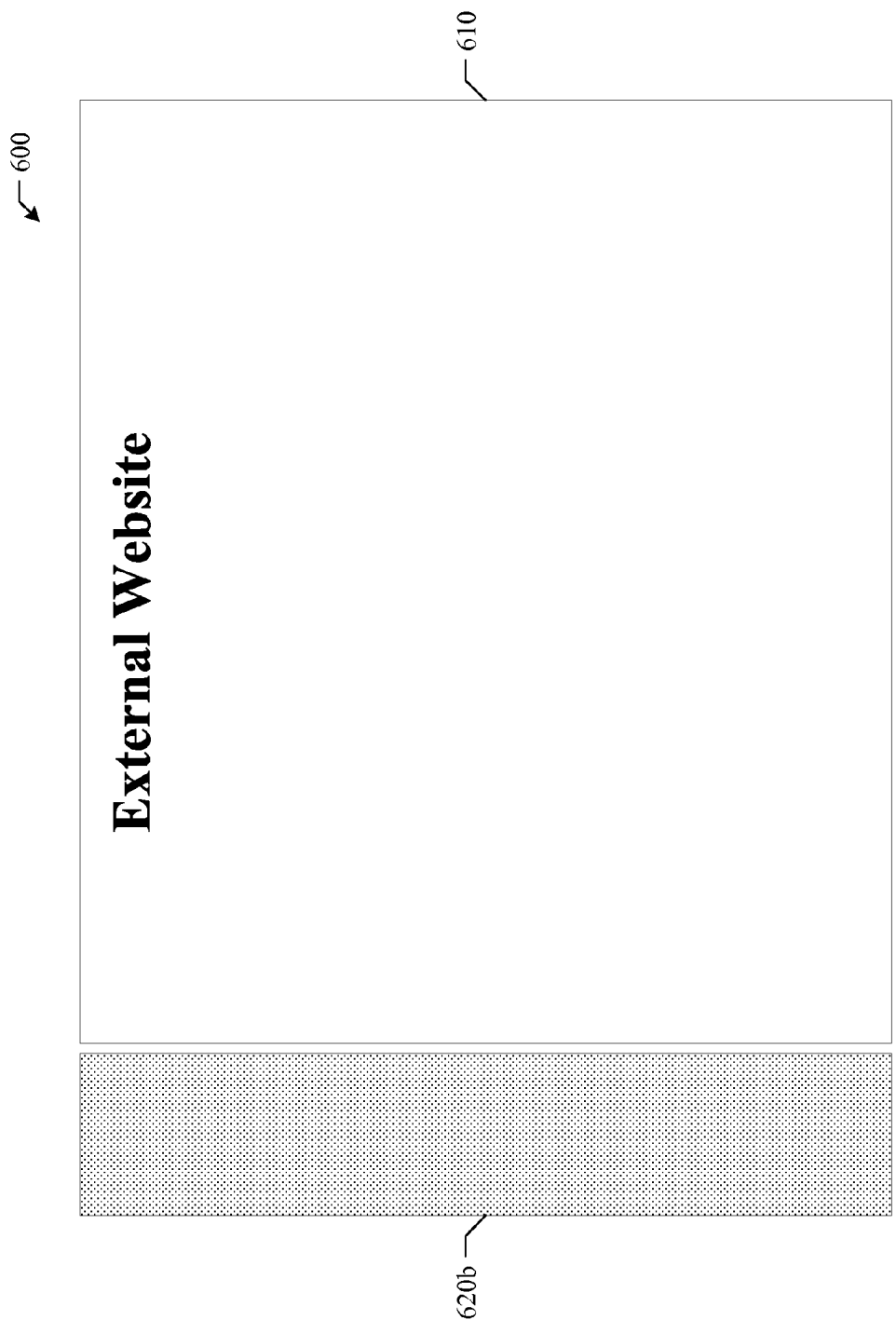
FIG. 5b illustrates a second example dashboard.

Particular embodiments may display one or more of the located social network data elements proximal to the rendered web page on a display, as illustrated in step 440. FIGS. 5a and 5b illustrate an example browser 600 that displays elements of external websites 610 and dashboard 620a, 620b. In particular embodiments the displayed social network elements may be displayed as an overlay of the rendered web page, such as in FIG. 5a, or as a sidebar to the rendered web page, such as in FIG. 5b. In particular embodiments, the browser client may implement this privacy dashboard 620a, 620b as a sidebar, a toolbar, a pop-up window and the like.

In particular embodiments, the browser client may include a dashboard 620a, 620b displaying the social network data elements identified in the structured document 610 currently loaded into the browser. In particular embodiments, for example, dashboard section 620a, 620b may display elements of a privacy dashboard. In particular embodiments, the external website includes the custom tags in only a subset of the structured documents it hosts. In particular embodiments, the browser client maintains an association between the domain of external website and the custom tags embedded in at least one of the structured documents corresponding to that domain. In particular embodiments, the browser client may allow the user to toggle the display of the dashboard on and off as desired. In particular embodiments, the browser client may allow the user to toggle the social network data elements within the dashboard on and off as desired. Still further, in particular embodiments, the browser client may allow the user to toggle the permissions listed in Appendix A on and off to give the external specific access to social network data.

In particular embodiments, the dashboard may be implemented as an element of the displayed structured document. In particular embodiments, the web browser application may modify or cause to be modified the DOM representation of the target webpage (without necessarily modifying the native HTML or other markup language code or content transmitted to the browser for rendering the target webpage (which is generally stored separately)) to include or display the located social network data elements. In particular embodiments, dashboard 620a, 620b may display the elements as a list of information retrieved from the social networking system. In particular embodiments, information in dashboard 620a, 620b may be information available from the user's profile that is stored on the social networking system. In particular embodiments, for example, a profile image of the user may be retrieved and displayed on the client device on a web page of the external website.

In particular embodiments, information posted by the member on the social networking system, for example, the status of the user as indicated on the social networking website, may be obtained and displayed on the client device proximal to the displayed web page of the external website. In particular embodiments, the information retrieved from the social networking system may comprise information related to connections of the user on the social networking system or any other aspects of the social networking system or the social networking system graph. In particular embodiments, for example, the information retrieved may include a list of friends or a list of friends of friends of the user. Alternatively, the information retrieved may be a flag indicating whether another user is a friend of the user or not.

In particular embodiments, the social network data elements displayed in dashboard 620a, 620b may have buttons where the user may select for display any of one or more of the information displayed proximal to the rendered web page of the external website. In particular embodiments, the social network data elements displayed may have color, font, status symbols or any other type of indicator associated with the information displayed proximal to the rendered web page of the external website.

In particular embodiments, where the user has no set of preferences for granting permissions to external websites to the user's social network data in the social networking system, the user may be prompted to allow aspects of the dashboard to be displayed. In particular embodiments, the user may instead be prompted to log into the social network system from the external website so that social network data can be exchanged between external website 320 and social networking system 330.

Figure 6:
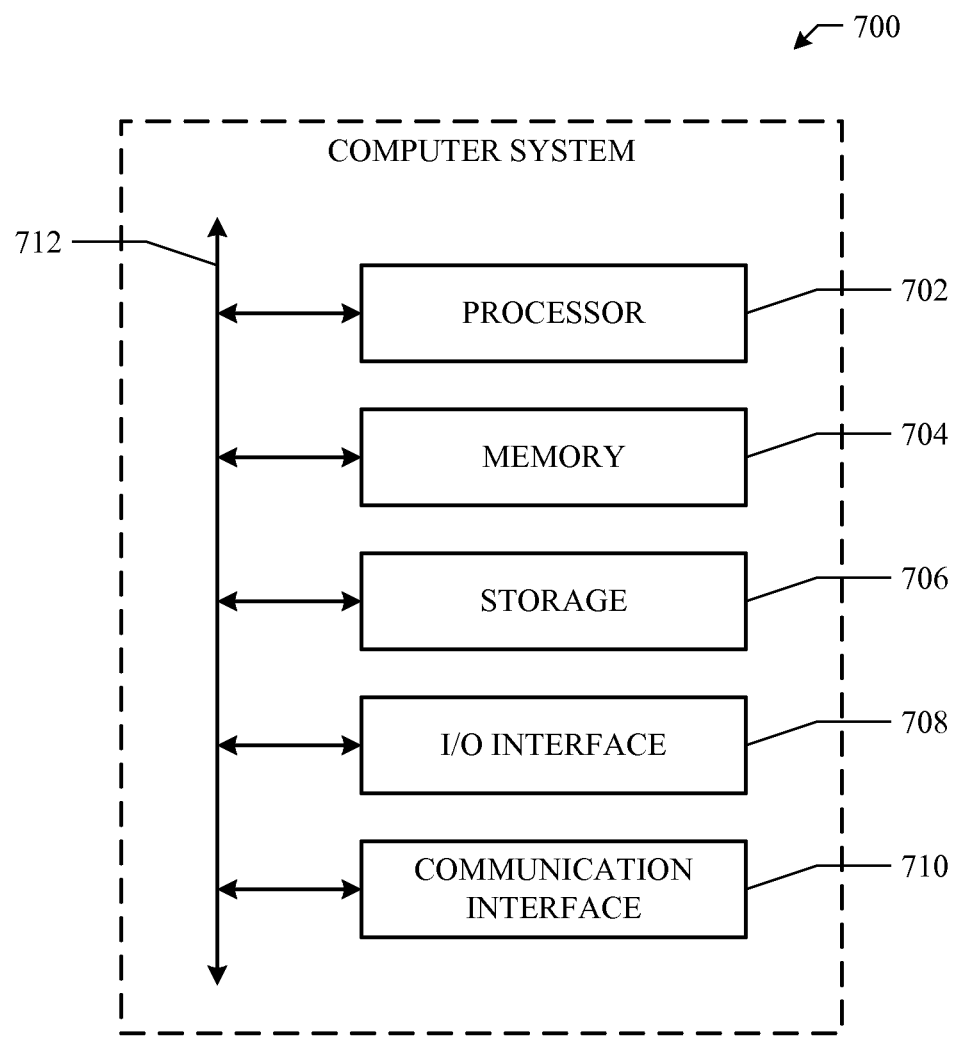
FIG. 6 illustrates an example computer system.

Particular embodiments may be implemented on one or more computer systems. FIG. 6 illustrates an example computer system 700 that may be used to implement a server. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 700 may include one or more computer systems 700; be unitary or distributed; span multiple locations; span multiple machines; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate.

In particular embodiments, storage 706 includes mass storage for data or instructions. As an example and not by way of limitation, storage 706 may include an HDD, a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

APPENDIX A

Data, publishing, and page permissions:

| User Permission | Friends Permission | Description |
| --- | --- | --- |
| user_about_me | friends_about_me | Provides access to the "About Me" section of the profile in the about property |
| user_activities | friends_activities | Provides access to the user's list of activities as the activities connection |
| user_birthday | friends_birthday | Provides access to the birthday with year as the birthday_date property |
| user_education_history | friends_education_history | Provides access to education history as the education property |
| user_events | friends_events | Provides access to the list of events the user is attending as the events connection |
| user_groups | friends_groups | Provides access to the list of groups the user is a member of as the groups connection |
| user_hometown | friends_hometown | Provides access to the user's hometown in the hometown property |
| user_interests | friends_interests | Provides access to the user's list of interests as the interests connection |
| user_likes | friends_likes | Provides access to the list of all of the pages the user has liked as the likes connection |
| user_location | friends_location | Provides access to the user's current location as the location property |

-continued

| | | |
|---|---|---|
| user_notes | friends_notes | Provides access to the user's notes as the notes connection |
| user_online_presence | friends_online_presence | Provides access to the user's online/offline presence |
| user_photo_video_tags | friends_photo_video_tags | Provides access to the photos the user has been tagged in as the photos connection |
| user_photos | friends_photos | Provides access to the photos the user has uploaded |
| user_relationships | friends_relationships | Provides access to the user's family and personal relationships and relationship status |
| user_relationship_details | friends_relationship_details | Provides access to the user's relationship preferences |
| user_religion_politics | friends_religion_politics | Provides access to the user's religious and political affiliations |
| user_status | friends_status | Provides access to the user's most recent status message |
| user_videos | friends_videos | Provides access to the videos the user has uploaded |
| user_website | friends_website | Provides access to the user's web site URL |
| user_work_history | friends_work_history | Provides access to work history as the work property |
| email | not available | Provides access to the user's primary email address in the email property. Do not spam users. Your use of email must comply both with Facebook policies and with the CAN-SPAM Act. |
| read_friendlists | manage_friendlists | Provides access to any friend lists the user created. All user's friends are provided as part of basic data, this extended permission grants access to the lists of friends a user has created, and should only be requested if your application utilizes lists of friends. |
| read_insights | not available | Provides read access to the Insights data for pages, applications, and domains the user owns. |
| read_mailbox | not available | Provides the ability to read from a user's Facebook Inbox. |
| read_requests | not available | Provides read access to the user's friend requests |
| read_stream | not available | Provides access to all the posts in the user's News Feed and enables your application to perform searches against the user's News Feed |
| xmpp_login | not available | Provides applications that integrate with Facebook Chat the ability to log in users. |
| ads_management | not available | Provides the ability to manage ads and call the Facebook Ads API on behalf of a user. |
| user_checkins | friends_checkins | Provides read access to the authorized user's check-ins or a friend's check-ins that the user can see. |

| Permission | Description |
|---|---|
| publish_stream | Enables your application to post content, comments, and likes to a user's stream and to the streams of the user's friends. With this permission, you can publish content to a user's feed at any time, without requiring offline_access. However, please note that Facebook recommends a user-initiated sharing model. |
| create_event | Enables your application to create and modify events on the user's behalf |
| rsvp_event | Enables your application to RSVP to events on the user's behalf |
| sms | Enables your application to send messages to the user and respond to messages from the user via text message |

| | |
|---|---|
| offline_access | Enables your application to perform authorized requests on behalf of the user at any time. By default, most access tokens expire after a short time period to ensure applications only make requests on behalf of the user when the are actively using the application. This permission makes the access token returned by our OAuth endpoint long-lived. |
| publish_checkins | Enables your application to perform checkins on behalf of the user. |
| manage_pages | Enables your application to retrieve access_tokens for pages the user administrates. The access tokens can be queried using the "accounts" connection in the Graph API. This permission is only compatible with the Graph API. |

What is claimed is:

1. A method comprising:

accessing, by a client device, a structured document from a website external to a social-networking system, wherein the structured document comprises markup language comprising instructions that identify one or more social-network data elements of a plurality of social-network data elements of the social-networking system and, when processed, retrieve the identified social-network data elements stored on the social-networking system;

determining each social-network data element identified by the instructions in the structured document;

retrieving, for each social-network data element, a user preference stored on the social-networking system, each user preference describing whether a server associated with the website is allowed to access the social-network data element;

determining, based on each user preference, whether the website is allowed to access each social-network data element;

responsive to determining that the website is not allowed to access at least one of the social-network data elements, providing a user interface element for display in association with a portion of the structured document associated with the at least one of the social-network data elements;

rendering, by the client device, the structured document as a displayable web page based on the markup language, wherein the displayable web page comprises one or more of the social-network data elements and a corresponding user preference element for each retrieved social-network data element;

receiving, by the client device, an input to the user interface element, the input indicating a modification of the user preference for the at least one of the social-network data elements; and transmitting the modification to the social-networking system to allow the website to access the at least one of the social-network data elements.

2. The method of claim 1, further comprising:

if the user preference indicates a user preference for automatic login, then logging a user into the social-networking system; or if the user preference does not indicate the user preference for automatic login, then prompting the user to login into the social-networking system.

3. The method of claim 1, further comprising:

determining whether the user preference comprises privacy controls of a user of the social-networking system;

if the user preference comprises privacy controls of the user of the social-networking system, then rendering the structured document based on the markup language wherein the displayable web page comprises one or more of the privacy controls; and displaying one or more of the privacy controls proximal to the rendered web page on the display.

4. The method of claim 1, wherein at least one social-network data element comprises a login interface.

5. A system comprising:

one or more processors; and a memory coupled to the one or more processors comprising instructions executable by the one or more processors, the one or more processors being operable when executing the instructions to:

access a structured document from a website external to a social-networking system, wherein the structured document comprises markup language comprising instructions that identify one or more social-networking data elements of a plurality of social-network data elements of the social networking system and, when processed, retrieve the identified social-network data elements stored on the social-networking system;

determining each social-network data element identified by the instructions in the structured document;

retrieve, for each social-network data element, a user preference stored on the social-networking system, each user preference describing whether a server associated with the website is allowed to access the social-network data element;

determine, based on each user preference, whether the website is allowed to access each social-network data element;

responsive to determining that the website is not allowed to access at least one of the social-network data elements, providing a user interface element for display in association with a portion of the structured document associated with at least one of the social-network data elements;

render the structured document as a displayable web page based on the markup language, wherein the displayable web page comprises one or more of the social-network data elements and a corresponding user preference element for each retrieved social-network data element;

receive an input to the user interface element, the input indicating a modification of the user preference for the at least one of the social-network data elements; and transmit the modification to the social-networking system to allow the website to access the at least one of the social-network data elements.

6. The system of claim 5, wherein the one or more processors are further operable when executing the instructions to:

if the user preference indicates a user preference for automatic login, then log a user into the social-networking system; or if the user preference does not indicate the user preference for automatic login, then prompt the user to login into the social-networking system.

7. The system of claim 5, wherein the one or more processors are further operable when executing the instructions to:
- determine whether the user preference comprises privacy controls of a user of the social-networking system;
- if the user preference comprises privacy controls of the user of the social-networking system, then render the structured document based on the markup language wherein the displayable web page comprises one or more of the privacy controls; and
- display one or more of the privacy controls proximal to the rendered web page on the display.

8. The system of claim 5, wherein at least one social-network data element comprises a login interface.

9. One or more computer-readable non-transitory storage media embodying software that is operable when executed to:
- access a structured document from a website external to a social-networking system, wherein the structured document comprises markup language comprising instructions that identify one or more social-network data elements of a plurality of social-network data elements of the social-networking system and, when processed, retrieve the identified social-network data elements stored on the social-networking system;
- determine each social-network data element identified by the instructions in the structured document;
- retrieve, for each social-network data element, a user preferences stored on the social-networking system, each user preference describing whether a server associated with the website is allowed to access the social-network data element;
- determine, based on each user preference, whether the website is allowed to access each social-network data element;
- responsive to determining that the website is not allowed to access at least one of the social-network data elements, providing a user interface element for display in association with a portion of the structured document associated with the at least one of the social-network data elements;
- render the structured document as a displayable web page based on the markup language, wherein the displayable web page comprises one or more of the social-network data elements and a corresponding user preference element for each retrieved social-network data element;
- receive an input to the user interface element, the input indicating a modification of the user preference for the at least one of the social-network data elements; and
- transmitting the modifications to the social-networking system to allow the website to access the at least one of the social-network data elements.

10. The one or more computer-readable non-transitory storage media of claim 9, wherein the software is further operable when executed to:
- if the user preference indicates a user preference for automatic login, then log a user into the social-networking system; or
- if the user preference does not indicate the user preference for automatic login, then prompt the user to login into the social-networking system.

11. The one or more computer-readable non-transitory storage media of claim 9, wherein the software is further operable when executed to:
- determine whether the user preference comprises privacy controls of a user of the social-networking system;
- if the user preference comprises privacy controls of the user of the social-networking system, then render the structured document based on the markup language wherein the displayable web page comprises one or more of the privacy controls; and
- display one or more of the privacy controls proximal to the rendered web page on the display.

12. The one or more computer-readable non-transitory storage media of claim 9, wherein at least one social-network data element comprises a login interface.

\* \* \* \* \*